United States Patent [19]

Vogel et al.

[11] 4,414,142

[45] Nov. 8, 1983

[54] ORGANIC MATRIX COMPOSITES REINFORCED WITH INTERCALATED GRAPHITE

[76] Inventors: F. Lincoln Vogel, R.D. 3, Whitehouse Station, N.J. 08889; Claude Zeller, 97 Fan Hill Rd., Monroe, Conn. 06468

[21] Appl. No.: 323,560

[22] Filed: Nov. 20, 1981

Related U.S. Application Data

[63] Continuation-in-part of Ser. No. 141,586, Apr. 18, 1980, abandoned, which is a continuation-in-part of Ser. No. 449,834, Aug. 23, 1974.

[51] Int. Cl.$^3$ .............................................. H01B 1/04
[52] U.S. Cl. .................................... 252/506; 252/511; 264/105
[58] Field of Search ............... 252/506, 503, 500, 511; 260/429 R; 264/60, 61, 65, 104, 105, 134; 428/902; 524/495, 496

[56] References Cited

U.S. PATENT DOCUMENTS

| | | | |
|---|---|---|---|
| 3,409,563 | 11/1968 | Olstowski | 252/506 |
| 3,933,688 | 1/1976 | Dines | 252/518 |
| 3,956,194 | 5/1976 | Armand | 252/506 |
| 4,119,655 | 10/1978 | Hulme | 260/429.3 |
| 4,237,061 | 12/1980 | Johnson | 260/429.3 |

OTHER PUBLICATIONS

Carbon 1966, vol. 4, pp. 223-226, "Rare Earth Graphite Intercalation Compounds".
Carbon 1966, vol. 4, p. 538, "Graphite Intercalation Compounds with Chlorides of Manganese, Nickel and Zinc".

Primary Examiner—Josephine Barr
Attorney, Agent, or Firm—Kenyon & Kenyon

[57] ABSTRACT

The incorporation of intercalated carbon/graphite in any of its forms such as powder, flake or fiber into an organic matrix results in a high strength, light weight composite with an electrical conductivity considerably higher than a similar product made with nonintercalated graphite. A great variety of organic polymers may be used, such as epoxy, thermoplastics and thermoset resins. Depending on the form of the intercalated graphite, fabrication techniques of extrusion, lay-up, injection molding and pressing can be employed to fabricate the parts from these composites. A wide spectrum of properties is available from this type of composite in terms of strength and conductivity which will be useful for such widely ranging applications as aircraft structures and shielding for electronic equipment.

8 Claims, 1 Drawing Figure

COMPOSITE RESISTIVITY VS. FILLING FACTOR

COMPOSITE RESISTIVITY VS. FILLING FACTOR

ORGANIC MATRIX COMPOSITES REINFORCED WITH INTERCALATED GRAPHITE

BACKGROUND OF THE INVENTION

This is a continuation-in-part of copending U.S. application Ser. No. 141,586 filed Apr. 18, 1980 which is in turn a continuation-in-part of copending application Ser. No. 449,834 filed Aug. 23, 1974.

The present application relates to a highly conductive composite which is graphite-based. More particularly, it relates to a composite of an organic polymer matrix and a graphite intercalation compound of graphite and a strong acid, a metal halide or a Bronsted acid and a metal halide.

Intercalated graphite materials are becoming known in the art, see for example A. R. Ubbeholde, Proc. Roy. Soc., A304, 25 1968 and U.S. Pat. No. 3,409,563. These intercalated graphite materials are highly conductive but do not possess strong yet flexible physical characteristics needed for many conductive applications.

Therefore, it is an object of the invention to develop a strong yet flexible, highly conductive intercalated graphite material which can be used for electrical applications.

SUMMARY OF THE INVENTION

These and other objects are achieved by the present invention which is directed to a highly conductive composite comprising an organic polymer matrix with a graphite intercalation compound of graphite and a strong oxidizing agent, graphite and a halide salt, or graphite, a Bronsted acid and a metal halide. In general, the strong oxidizing acid is any inorganic or organic protonic acid capable of high dissociation and of oxidizing carbon, such as an oxo or peroxy acid. The halide salt may be any which will coordinate with a halide anion. Generally, these will include halides of transition elements, Group III A elements and Group IV A, V A and VI A metal or metaloid elements. The Bronsted acid is any compound capable of donating a proton and making an acidic solution in water. The metal halide may be selected from boron trihalide, a tetrahalide of a Group IV element of the Periodic Table or a pentahalide of a Group V element of the Periodic Table.

The composite of the invention produces a new, electrically conductive substance with physical properties very similar to that of particulate carbon strengthened organic material but with greatly enhanced electrical coductivity. The composite can be processed by a wide variety of fabrication techniques such as extrusion, lay-up, injection molding and pressing. The composite can be used in a wide variety of structures which were previously believed to require metal such as aircraft, covers for electronic equipment, faraday cages and other related applications where shielding, ground planes and the build-up of static electricity may be a concern.

The organic polymer can be combined with intercalated graphite in the form of a flake, fiber or powder. A preferred embodiment which produces impressive gains in conductivity is one produced from graphite intercalated using $HNO_3$, $HF$, $HNO_2$, $H_2SO_4$, $NClO_4$, Aqua Regia, $NiCl_2$, $CuCl_2$, $SbF_5$, $AsF_5$, $HNO_3$ with $PF_5$, $AsF_5$ or $SbF_5$, $HF$ with $PF_5$ $AsF_5$ or $SbF_5$.

Another preferred embodiment producing additional gains in conductivity is one wherein a polarizable dopant, which provides "p" type conduction, is used with the organic matrix. Arsenic pentafluoride doped polyparaphenylene is a particularly effective combination. Further, conductivity gains can also be achieved by subsequently combining intercalated or pure graphite flake or powder with the composite of intercalated graphite fiber and an organic matrix.

DETAILED DESCRIPTION OF THE INVENTION

Figure 1:
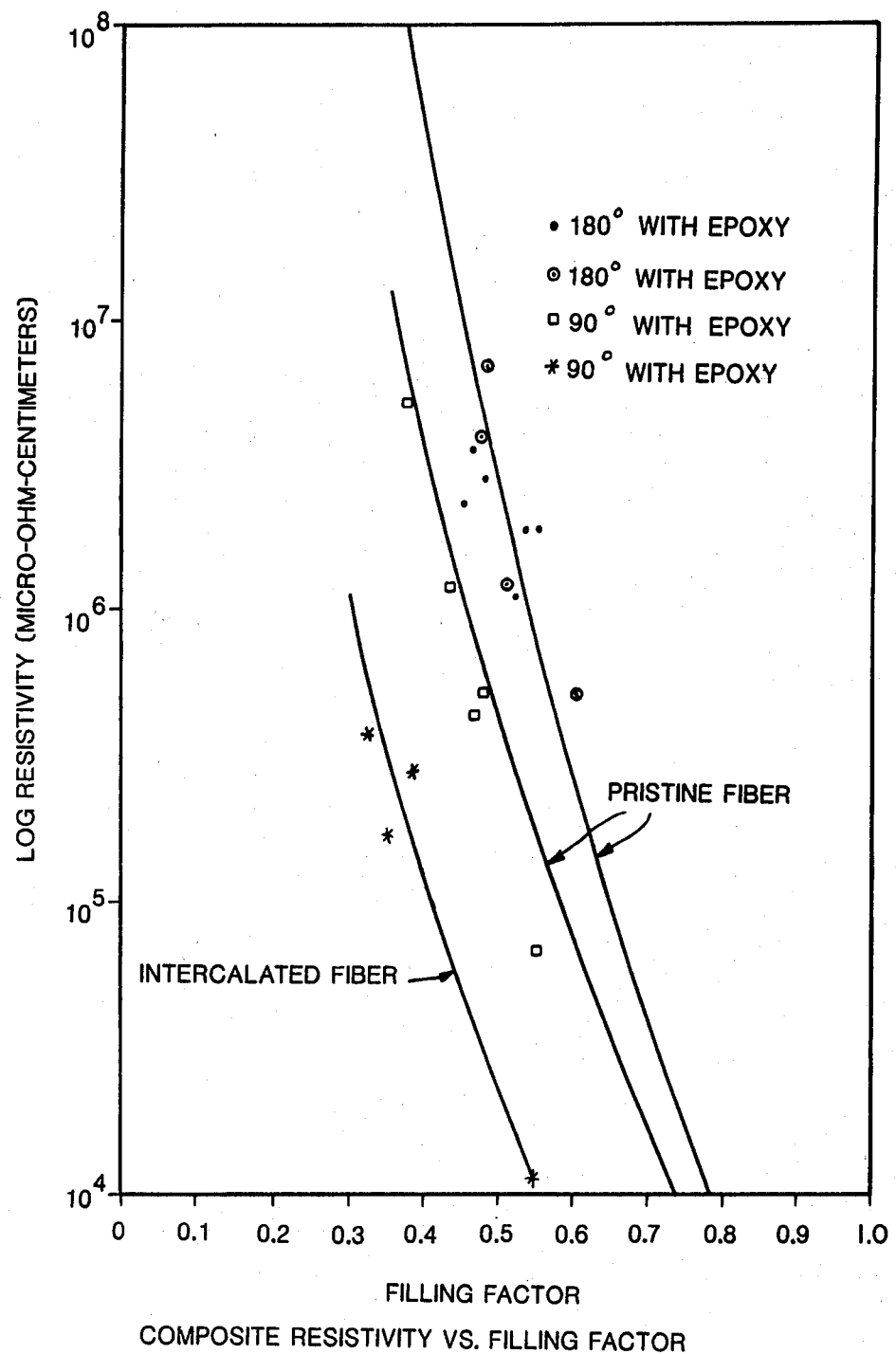
FIG. 1 is a plot of the data of Table I.

The graphite intercalation compounds of graphite and a strong acid, graphite and a halide salt or graphite, a Bronsted acid and a metal halide, which are used to prepare the composites of the invention, are in part disclosed and prepared according to U.S. application Ser. No. 499,834 filed Aug. 23, 1974 and U.S. application Ser. No. 206,647 filed Nov. 13, 1980, which are incorporated herein by reference. At least some examples of each type are known in the art.

In general, the strong oxidizing acids include mineral acids such as $H_2SO_4$, $HClO_4$, $HClO_3$, $NHO_3$, $NHO_2$, $HIO_4$, $HIO_3$, $HBrO_4$, $HBrO_3$, as well as peroxytrifluoracetic acid, and other similar oxidizing agent protonic acids.

In general, the halide salts used in the graphite intercalation compounds are those which will coordinate with a halide or similar anion and form an anion complex. Such salts include the halides of transition elements, Group III A elements, and Group IV A, V A and VI A metals and metaloids. Examples include $SbF_5$, $CrO_2Cl_2$, $VF_5$, $FeCl_5$, $NiCl_2$, $CuCl_2$, $BiF_5$, $PtF_4$ and the like.

In general, the metal halides used in the graphite intercalation compounds are those metal halides of Group IV and V metals of the Periodic Table are of those metals which are tabulated under the headings IV A, IV B, V A and V B of the "Periodic Chart of the Elements" published in *The Condensed Chemical Dictionary*, Seventh Edition, facing p. 1, Reinhold (1966). In addition to these, it has been found that boron trihalides, especially boron trifluoride ($BF_3$), are useful. It has been found preferably to use $BF_3$, $SiF_4$, $HfF_4$, $TiF_4$, $ZrF_4$, $PF_5$, $NbF_5$, $TaF_5$, $AsF_5$ and $SbF_5$. Mixtures of these and other metal polyhalides are also within the scope of the present invention.

The graphite intercalation compounds are prepared by combining a strong acid, a halide salt vapor or solution or a Bronsted acid-metal halide system, hereinafter called reagents, with graphite of relatively high crystallinity. The Bronsted acid system preferably comprises the proton donor which is a Bronsted acid such as hydrogen fluoride, chloride, bromide or nitric, nitrous, sulfuric or perchloric acid and an electron acceptor metal halide which is a Lewis Acid such as boron trihalide, a tetrahalide from a Group IV metal, or a pentahalide from a Group V metal. Although not critical, this system usually comprises the Bronsted acid and one of the above Lewis acids in approximately equimolar proportions. However, the molar ratio of Lewis acid to Bronsted acid can range from about 0.01:1 to 100:1.

Since many of these materials are volatile and highly reactive, care must be taken to exclude moisture and oxygen and they are best handled under a substantially moisture-free, inert atmosohere. It has been found especially practical to combine the reagents and the graphite under inert conditions. Typically, it is preferred to employ an apparatus such as a dry box. This apparatus permits the reagents and graphite materials to be placed separately, in sealed containers, into a closed chamber which is flushed with an intert gas such as dried argon or nitrogen. Access to the chamber is provided by gas-tight gloves. Hence, the sealed containers are opened under an inert atmosphere and mixing of the reagents and graphite can be performed without fear of contamination.

The graphite materials to be combined with the reagents may be in the form of large crystals, crystalline powder, carbon, or graphite filaments, powdered carbon, bulk or sintered graphite. It is a general rule that the more perfect the graphite starting material is, the better the conductivity of the resultant intercalation compound. Hence, it is preferable to employ graphite of relatively high purity and which has a high degree of crystallinity. However, satisfactory results have been obtained with graphites with lower degrees of purity, and crystallinity. In the case of carbon filaments and powdered carbon, the material is preferably graphitized by known methods prior to combination with the reagents.

Formation of the graphite intercalation compound is achieved by exposing the graphite to the reagents, described supra, which are preferably in the liquid or solution state. This will provide convenience in handling as well as efficiency of reaction. The intercalation reaction, however, can also be conducted by exposing the graphite to a reagent which is in the vapor phase.

Reaction times range from a few minutes to several hours, depending on whether the graphite is powdered, large crystals, filaments, etc. Optimum reaction times have been found to be 1 to 30 minutes with filaments and powders and 0.1 to 3 hours with large crystals. In general, the reaction time is about 20 minutes for most intercalation compounds.

Temperatures at which the graphite reagent reaction can be conducted range from about 10° C. to 200° C. The upper limit is determined by the boiling point of the reagents and whether the reaction is conducted in the liquid or vapor phase. It has been found that the resultant conductivity of the intercalation compound varies somewhat with the reaction temperature. For example, when the reagents employed are an equimolar gaseous mixture of HF and $BF_3$ and the graphite is "Thornel 75" graphite (produced by Union Carbide Corporation), treatment at room temperature will result in an average resistivity ratio of the original graphite to the intercalation compound of about 14, whereas reaction at 55° C. will produce a ratio of about 25. If a liquid phase reaction is desired and the reaction temperature is above the boiling point of the reagents, the reaction may be conducted at elevated pressures to ensure that the reagents are in the liquid phase.

Because of the corrosive nature of the reagents employed in this process, it is advisable that the apparatus and treatment vessels which contact the reactants be constructed of inert materials. Typical of such materials are 316-type stainless steel, "Monel" (available from the Huntington Alloy Products Division of the International Nickel Co., Inc.), "Teflon" (E. I. DuPont de Nemours & Co.), and "Kel-F" polymer (3M Company).

In general, the preparation of the graphite and strong acid intercalation compounds and the preparation of the graphite and halide salt intercalation compounds will follow the foregoing procedures. Typically, these processes involve exposure of graphite to the strong acid or halide salt as a pure liquid or in solution with an inert solvent at concentrations calculated to deliver the desired amount of acid or halide salt to the graphite. In a preferred modification, the strong acid types are prepared by the four step process given below which avoids exfoliation. The Bronsted acid types will be prepared in particular by the foregoing procedures.

To prepare a composite of the present invention, the graphite intercalation compounds are separately preformed according to the foregoing procedures or by processes known to those skilled in the art. Then the intercalated compound in the form of solid particles (flakes, fibers, powder or similar divided solid) is added to an organic polymer to form a mixture of the two ingredients. The mixture may be a solid or liquid in which appropriate solid or liquid polymers are used and additionally may be contained as a dispersion in an inert solvent. The polymer may or may not be soluble in the solvent; the effect desired is the production of a substantially even distribution of the ingredients. The final step in the processing of the mixture is the melding together of the ingredients to form a solid matrix of the compound in the polymer. This may be accomplished by use of pressure and/or temperature such as from injection molding, extruding, pressing, hammering, turning, heating, kneading, heating and the like. When the mixture has been solvated, removal of the solvent under conditions wherein the mixture is formed into the desired shape, will also produce the composite. Blowing agents, plasticizers, hardening agents and other known polymer additives can also be added.

Alternatively, the intercalated compound can be mixed with the monomer to be polymerized and the polymerization reaction carried out in the presence of dispersed compound. Extruding, pressing, forming, layering, setting, injecting or otherwise molding the polymerizing mixture will produce the composite. Additionally, a linear polymer and intercalated compound mixture may be formed as a solid, liquid, dispersion or solution and may be subsequently cross linked, vulcanized or further polymerized to produce the composite.

Thermal processes can also be used to prepare the composite provided that the temperature required for polymer softening will not destroy the intercalated compound. The ingredients as flakes, powder, blocks, fibers, sheets, or similar solid forms are combined in a heating apparatus, heated until the polymer softens, the compound dispersed in the softened polymer and the warmed composite allowed to pass into or through a cool shape determining form. As a modification, the polymer alone may be softened and passed through or into a shape determining form. As the polymer is passed, the compound, preferably with dimensional orientation among the compound particles, is placed into the polymer. As the resulting composite is formed, pressure, flexing, stress or similar mixing is applied to distribute the compound and form the matrix.

The temperature employed in the processes can be any which does not affect the intercalated compound. Typically, temperatures from about room temperature to about 160° C. will be employed. An inert atmosphere will preferably be employed during the processing.

Examples of typical processes include the following: mixing solid compound and polymer particles followed by applying pressure to form the matrix of compound in polymer; mixing the compound in liquid, semiliquid or softened polymer followed by hardening or application to or into a shape holding form; laying-up of layers of compound and polymer followed by melding together by pressure or using warm temperatures which soften the polymer; injection molding or extruding a solid-solid mixture, solid-liquid mixture of the ingredients or a dispersion or solution of the ingredients in an inert solvent; pressing a particulate or softened mixture of the ingredients, combining the ingredients in a suitable inert solvent followed by solvent removal and composite shape formation; heating to soften or liquify the polymer and mixing the ingredients followed by cooling; and cross linking or polymerizing a mixture of linear polymer or monomer respectively and compound under conditions typically applied to the linear polymer or monomer alone but which will not adversely affect the compound.

Any organic polymer which will form a substantially uniform mixture with the intercalated graphite compound will function as an ingredient for the composite. The polymer properties may be chosen as desired in order to obtain such properties as plasticity, flexibility, strength, rigidity, high or low density, thermosetting, thermoplasticity, temperature resistance, elasticity, deformability, adhesiveness, tackiness, polymeric bonding, crystallinity or non-crystallinity, and/or high or low molecular weight. The polymers having any or an appropriately grouped number of these properties and the methods to make them are well known to those skilled in the polymer arts. In general, they include epoxy resins, thermoplastic resins, thermosetting resins, aldehyde resins, aromatic resins, polyesters, polyamides, polyolefins of high and low molecular weight and varying degrees of cross linking, polycarbonates, polyfluorinated olefins, polyurethanes, polyethers, and the like.

After the composite of an organic matrix and an intercalated graphite compound is formed, the composite essentially has the mechanical properties of the organic matrix material with an enormously enhanced electrical conductivity. Typically, the electrical conductivity will be improved over graphite-organic matrix composites by a factor of about 100 as illustrated by the Examples below.

In general, the conductivity of the composite will depend on the filling factor. The filling factor is the ratio of the volume of the intercalated graphite divided by the volume of the composite, i.e., the intercalated graphite in the organic matrix. While any amount of filling of the organic matrix will result in enhanced electrical conductivity, a filling factor of between 0.10 and 0.65 by volume is particularly preferred because it provides an especially highly conductive composite. The corresponding filling factor percentage is found by multiplying the factor by 100. Thus, the preferred filling percentage is about 10% to about 65% by volume. Fiber or flake orientation should also be maintained during filling.

Conductivity of the composite can also be significantly improved by the use of dopants which provide "p" type conduction in combination with the organic matrix. These p type dopants are inorganic compounds which are able to accept electrons. Examples are antimony pentafluoride, arsenic pentafluoride, bromine, iodine and other Group III, IV, and V salts which can act as Lewis acids such as those specifically given in the foregoing description of metal halides. A particularly preferred example of a doped organic matrix is arsenic pentafluoride doped poly (paraphenylene).

Another conductivity gain can be achieved by combining intercalated or pure graphite flake with previously prepared composite from intercalated graphite fiber material. The converse is also true; that is, composite conductivity can be improved by adding intercalated or pure graphite fiber to a composite containing intercalated graphite flake. Conductivity enhancement will also occur if either of the foregoing composites with additional fiber or flake have organic matrices which are doped with a p type dopant.

When employing an intercalated graphite compound which is subject to exfoliation, a modification of the general process to make the composite can be used to advantage. In this modification, the graphite is first exposed to the intercalating agent at a controlled temperature. Secondly, after intercalation to the desired degree has been achieved, an inert or active gas at a pressure of about 1 atmosphere is introduced. Thirdly, the pressure of the atmosphere surrounding the graphite being intercalated is reduced to about $10^{-4}$ inches of mercury. Lastly, the intercalated graphite is maintained in an inert atmosphere dry box until the production of the intercalated graphite compound-organic matrix composite is completed. In particular, when HF and $AsF_5$ are used to intercalate, a temperature of about 23° C. will be desirable. If $HNO_3$ is used to intercalate, a temperature of reaction of about 20° C. is desirable. It is also advantageous to reduce the pressure from 1 atmosphere to the desired lower pressure over a period of several hours.

The advantage of using intercalated graphite is underscored by the fact that a greater than proportional increase in electrical conductivity occurs in the composite relative to one formed with pure graphite, i.e., graphite which has not been intercalated. That is, if the electrical conductivity of a pure graphite reinforced organic matrix composite is increased by one order of magnitude, the conductivity of the corresponding composite prepared from intercalated graphite may be increased by several orders of magnitude more. Also, the increases in electrical conductivity of the composite are achieved without sacrifice of mechanical strength, rigidity and the other existing properties of the organic polymer used to form the matrix.

The composite may be used as an outer skin, as a filler, binder, adhesive or glue to prevent or control the entrance or loss of electromagnetic radiation. Thus the present invention can be employed as a cover for a radar set or as an adhesive or glue in combination with a metal cover. The composite can also be used as a cover for a toaster or other household appliance. In short, the present invention teaches a novel composite material which can have a widely adjustable range of conductivity and which can be used in a wide variety of applications ranging from aircraft skins to glues and adhesives, where flexibility, strength, adhesiveness, elasticity, and other properties of organic polymers as well as the capability of adjusting electrical conductivity, electromagnetic and shielding capacity are important.

While the invention has been described with a variety of materials, modifications will be readily apparent to those skilled in the art. Such modifications are intended to be within the scope of the appended claims.

The following Preparations and Examples are provided to further illustrate embodiments of this invention. It will be apparent that there are many more embodiments within the scope of this invention than those set forth below, and this invention is not meant as being restricted by the Examples.

PREPARATION 1

Graphite, Boron Trifluoride, Hydrogen Fluoride Intercalation Compound

Graphite filaments were intercalated by exposing them to a gaseous mixture of $BF_3$ and HF under anhydrous conditions in an inert atmosphere. The fibers employed were Thornel 75 graphite fibers marketed by Union Carbide Corp., and were approximately 10 microns in diameter. A reaction chamber less than 1 liter in volume, of 316 type stainless steel was thoroughly flushed with dry nitrogen at a rate of 1 l./min. for 30 minutes. The chamber, containing the graphite fiber, was heated to about 57° C., whereupon $BF_3$ and HF were introduced at the rate of 3.5 l/min. and 3 l./min. for about 30 minutes. The intercalated filaments were then removed from the apparatus, washed consecutively with distilled water and acetone, and dried at room temperature.

PREPARATION 2

Graphite, Phosphorous Pentafluoride, Hydrogen Fluoride Intercalation Compound Twenty-five ml. of an equimolar mixture of $PF_5$ and anhydrous HF was prepared by condensation at $-80°$ C. in a Kel-F tube. The condensed mixture was then evaporated under a nitrogen atmosphere into an adjoining reaction tube which contained about 5 g. of graphite powder (Poco Graphite, Inc.), and permitted to react at about 25° C. for about 10 minutes. The reaction tube was then flushed with nitrogen and the intercalated graphite powder was recovered.

PREPARATION 3

Graphite, Antimony Pentafluoride, Hydrogen Fluoride Intercalation Compound

A mixture of $SbF_5$ and HF was prepared by weighing 61.5 g of $SbF_5$ into a tared Kel-F reaction tube. Graphite filaments similar to those of Preparation 1 were then immersed in 25 ml. of the above $SbF_5$/HF mixture at room temperature for about 15 minutes. The resultant intercalated filaments were washed with distilled water, then acetone, and dried at room temperature.

PREPARATION 4

Graphite, Silicon Tetrafluoride, Hydrogen Fluoride Intercalation Compound

An equimolar mixture of $SiF_4$ and HF is prepared by condensing $SiF_4$ into liquid HF at $-80°$ C. about 25 ml. of this mixture is evaporated into a reaction chamber containing 5 grams of Poco graphite powder. The powder and gas are permitted to react at about 25° C. for 10 minutes with occasional agitation to expose fresh graphite surfaces. The excess gas is then flushed out of the tube and the intercalated powder is removed.

EXAMPLE 1

General Preparation of a Composite of an Epoxy Organic Matrix with Graphite Intercalation Compounds

1. Materials and Preparation

Graphite Intercalation Compounds

The intercalation reactions were run directly on graphite fiber as given in the foregoing description or by following this description but substituting the appropriate intercalating agent. Compounds were prepared from graphite fiber and $HNO_3$, $AsF_5$, HF and $AsF_5$, aqua regia (equimolar amounts of $HNO_3$ and HCl) and $CuCl_2$ in addition to those prepared above. Nitric acid was prepared in the laboratory by distilling $HNO_3$ from a mixture of $H_2SO_4$ and $KNO_3$. Commercial $AsF_5$ was used without additional purification.

Composites

The composites may be prepared by mixing the desired volume percent of organic polymer and intercalated compound together in an inert atmosphere to produce a dispersion of the compound and polymer. Any of the compounds illustrated by the foregoing preparations can be utilized in this method. The mixture is then pressed, extruded, molded, heated or otherwise shaped to prepare the desired composite form, e.g. wire, bar, plate, sheet and the like. In a particular example, alternate layers of polymer matrix and oriented compound were placed in a press, pressure applied and the mixture cured to an essentially homogeneous matrix of the composite. Alternatively, the polymer can be dissolved in a minimum amount of low boiling inert solvent, the intercalated compound added, the solvent removed under conditions which will not affect the intercalated compound and the resulting composite cured.

In particular, epoxy-fiber composites were prepared from commercial epoxy Stycast No. 1264. In the first experiments, uniaxial composites of 10–30 volume % fiber were layed-up by hand and cured at room temperature under a nominal 5-pound load. Later, the specimens were cured under a 2000-pound load in a Carver Press at room temperature. This latter technique made it possible to prepare samples of nearly 50 volume % fiber.

2. Intercalation Equipment

An apparatus was built for gas-phase intercalation of graphite fiber. In essence, it is an elaboration on the known set-up which has been used for studies on the kinetics of intercalation of HOPG crystals.

Essentially, the intercalation unit consisted of a glass vacuum manifold connected to an intercalation chamber, liquid reagent reservoir, gaseous reagent supply, mercury manometer (protected by a 3 cm layer of oil), vacuum manifold and liquid nitrogen traps. The intercalation chamber was fitted with a quartz pan attached to a quartz spring balance. Weight increase of an HOPG crystal, or length of graphite fiber tow, could be monitored by following the extension of the spring with a cathetometer. In addition, the intercalation chamber was fitted with a glass rack upon which a larger quantity of graphite fiber tow could be loosely wound. It was established experimentally that the short piece of tow resting on the quartz pan experienced the same relative weight increase as the large tow at the bottom of the intercalation chamber. Therefore, there was no significant concentration gradient of intercalant gas in the reactor, and the reaction rate was not controlled by diffusion of gas to the fiber surface.

3. Resistivity: Theory and Experimentation

Experimental study of electrical resistivity in epoxy matrix composites showed that a strong dependence on the filling factor f was present. The filling factor is defined as the volume of the intercalated compound over the volume of the composite. The resistivity varies as "1/f" where n is between 7 and 12, inclusive. The value n appears to depend on the orientation of the fibers in the matrix and upon the type of material. It has been found that n=12 for uni-directional (180°) graphite fibers and n-9.5 for fibers at 90°.

Table 1 summarizes the results of the resistivity studies conducted upon a composite of nitric acid intercalated graphite in an epoxy organic matrix prepared with a varying filling factor as given in the foregoing description.

A plot of filling factor versus the resistivity taken from the data of Table 1 is shown in FIG. 1.

TABLE 1

Summary Of The Results
Of The Resistivity For Composites
Direct Measurements of the Resistivity of
Graphite and $HNO_3$ - Graphite Fibers Graphite p = 540 + 30 $\mu\Omega$cm
$HNO_3$ Graphite p = 113  Average value $\bar{o}$ = 120 $\mu\Omega$cm
130
135

Measurements of Composites

| Composite No. | Filling Factor f | Resistivity In $\mu\Omega$cm p | Exponent n | Average Value Of The Exponent | Type Of Ply |
|---|---|---|---|---|---|
| 1 | .45 | 2.3 × 10$^6$ | 10.4 | n = 11.9 | 180° with epoxy |
| 2 | .48 | 2.8 × 10$^6$ | 11.6 | | |
| 3 | .52 | 1.1 × 10$^6$ | 11.6 | | |
| 4 | .55 | 1.9 × 10$^6$ | 13.6 | | |
| 5 | .46 | 3.6 × 10$^6$ | 11.3 | | |
| 6 | .53 | 1.9 × 10$^6$ | 12.9 | | |
| 7 | .25 | — | — | n = 11.8 | 180° with epoxy |
| 8 | .35 | 9. × 10$^7$ | 11.4 | | |
| 9 | .47 | 3.8 × 10$^6$ | 11.7 | | |
| 10 | .51 | 1.2 × 10$^6$ | 11.4 | | |
| 11 | .48 | 7. × 10$^6$ | 12.9 | | |
| 12 | .37 | 5.1 × 10$^6$ | 9.2 | n = 9.54 | 90° with epoxy |
| 13 | .43 | 1.2 × 10$^6$ | 9.1 | | |
| 14 | .46 | 4.2 × 10$^5$ | 8.6 | | |
| 15 | .47 | 5.5 × 10$^5$ | 9.2 | | |
| 16 | +.55 | 6.7 × 10$^4$ | 11.6 | | |
| 17 | .33 | 3.8 × 10$^5$ | 7.3 | n = 7.45 | intercalated fibers & epoxy |
| 18 | .35 | 1.7 × 10$^5$ | 6.9 | | |
| 19 | .38 | 2.8 × 10$^5$ | 8.0 | | |
| 20 | +.55 | 1.1 × 10$^4$ | 7.6 | | |

+Sample prepared under pressure.

To establish that the intercalation experiments were reproducible, four runs were made with each of the two fibers under the same conditions (fiber temperature=30° C., acid temperature=25° C.). Induction period seemed eratic. From the time that intercalation began, however, the percent weight was reproducible to about ±15% for any reaction time.

The rate of intercalation of $HNO_3$ into the graphite lattice was also studied in GY-70 fiber and pitch based fiber to determine whether the rate is diffusion controlled. It was found that since the rates of intercalation of GY-70 graphite fiber was slower than the rate for pitch based fiber, rates must be controlled by diffusion through amorphous carbon to crystalline sites. The difference in rate of intercalation of GY-70 and pitch based fiber can be explained by difference in orientation of the crystallites. In the GY-70 fiber, the a-axes are parallel to the fiber axis and normal to fiber surface. This makes the crystalline regions of the pitch based fiber more accessible to the intercalating species, at least on the surface of the fiber, than in the GY-70.

In a typical four step process to obviate exfoliation, graphite fibers are intercalated to stage 2 with nitric acid and then the neutral spacer molecules ($HNO_3$) were removed under vacuum to give a stage 4 compound (as determined by net weight gain). The vacuum in the intercalation chamber was then broken with $AsF_5$, and $AsF_5$ pressure brought up to half an atmosphere.

$AsF_5$ then intercalated rapidly and the reaction stopped at about a stage 3 compound (as determined by weight gain). The term "stage" is used very loosely here, because the mixed intercalation compound of $HNO_3$ and $AsF_5$ has never been characterized—it is simply known that this compound demonstrates excellent electrical conductivity when formed from HOPG.

The $AsF_5$ reaction was complete in one hour. Clearly then, the $HNO_3$ intercalation is the critical step in the process kinetics.

A study of the effect of temperature on the intercalation rate of $HNO_3$ on HOPG and both pitch base and GY-70 fibers showed that intercalation rates could be increased by a factor of five by running the reaction at a pressure near one atmosphere, a fiber temperature of 80° C. and acid temperature of 77° C. (the normal boiling point of $HNO_3$ is 80° C.). This, however, caused one unexpected difficulty. When a vacuum is pulled on the system to remove the labile $HNO_3$ from the lattice, the internal pressure of these $HNO_3$ neutral spacer molecules is so high that violent exfoliation of the lattice occurs.

4. Intercalation Process Using Various Types of Graphite

In the initial experiments with highly oriented pyrolytic graphite (HOPG), it was established that the best electrical conductivity of graphite could be obtained by first intercalating the crystal to stage 4 with nitric acid, then removing the labile $HNO_3$ molecule under vacuum, and reintercalating with $AsF_5$.

A second set of runs was made to compare the kinetics of the gas-phase intercalation of graphite fiber by nitric acid with that for HOPG crystals. Except for intercalation rates, the reaction between $HNO_3$ and graphite fiber demonstrated all of the earmarks of the same reaction carried out with HOPG. After an induction period of 1–20 minutes, brown gas was evolved at the surface of the tow and the sample suspended from the quartz began to pick up weight. The graphite fiber did, however, intercalate far more slowly than HOPG. Therefore, in general, for a given set of conditions, it was found that intercalation rate of GY-70 fiber was about (1/20) of that for HOPG and that of the pitch base fiber was only (1/3) of that for HOPG.

EXAMPLE 2

Preparation of a Composite Using $CuCl_2$ Intercalated Graphite Powder

A quantity of stage III graphite intercalated with copper chloride was prepared as follows: to a weighed quantity of graphite powder was added 110% by weight of $CuCl_2$ $1H_2O$. This amount is sufficient to form the state I compound with stoichiometry $C_{5.9}CuCl_2$. The two powdered ingredients were mixed thoroughly, loaded into a glass reaction vessel and heated to 125° C. for 25 hours with dry $N_2$ flowing through to remove $H_2O$. Then, the temperature of the reaction vessel was raised to 500° C., the dry $N_2$ gas flow stopped and replaced by dry chlorine at atmospheric pressure plus an overpressure of 3 to 6 inches of water. Reaction continued for two days until the 001 x-ray diffraction lines of a test sample showed a predominance of the stage III compound.

Typically this treatment results in a pressed powder compact resistivity of the intercalated graphite of about 500 microohm cm compared to 2000 microohm cm for the pressed graphite powder.

The two kinds of powder (graphite and $CuCl_2$ intercalated graphite) were incorporated separately into organic matrix composites. A volume of graphite or intercalated graphite powder was thoroughly mixed with a volume of nylon powder having an estimated particle size of 1 micron ($10^{-4}$ cm). The mixtures were then pressed into discs 2.54 cm in diameter about 3 mm thick, and the electrical resistivity determined by an rf induction method as described by Vogel, Carbon, 17, 255 (1979) with the following results.

| Mixture | | Resistivity in ohm cm | |
|---|---|---|---|
| Vol % Graphite | Vol % Matrix | Unintecalaged Graphite | Stage III Intercalated $CuCl_2$ - Graphite |
| 20 | 80 | 0.18 | 0.12 |
| 60 | 40 | 0.014 | 0.0016 |

These results are not considered to be the best electrical conductivities obtainable from this system, but rather, in agreement with the fiber composites previously described, a demonstration that at higher loadings, a more than proportional increase can be obtained in the electrical conductivity of a graphite-polymer composite due to intercalation of the graphite as compared to the increase in the electrical conductivity of the graphite alone due to intercalation. Those skilled in the art will recognize that higher electrical conductivities (or lower electrical resistivities) than the values quoted are obtainable by adjustment of variables such as particle size, stage of intercalation, treatment of the powders, and temperature, pressure and time of compression.

What is claimed is:

1. An electrically conductive composite comprising about 10 to about 65 volume percent relative to the volume of the composite, of an intercalated graphite compound in a remaining volume percent of an organic polymer matrix, wherein the intercalated graphite compound is selected from:
   (a) graphite intercalated with an inorganic or organic acid capable of high disassociation and capable of oxidizing carbon; or
   (b) graphite intercalated with a halide salt of a transition element, a Group III A element, or a Group IV A, V A or VI A metal or metaloid element, said salt being capable of coordinating with a halide anion to form an anionic complex; or
   (c) graphite intercalated with a Bronsted acid compound capable of donating a proton and making an acidic solution in water and a metal halide selected from boron trihalide, a tetrahalide of a Group IV element or a pentahalide of a Group V element;
said intercalated graphite compound being in the form of flakes, fibers, filaments, a powder or crystals prior to its incorporation into the composite.

2. A composite according to claim 1 wherein the strong acid is selected from HF, $H_2SO_4$, $HClO_4$, $HClO_3$, $HNO_3$, $HNO_2$, $HIO_4$, $HBrO_4$, $HBrO_3$, $HIO_3$, or $CF_3CO_3H$.

3. A composite according to claim 1 wherein the Bronsted acid is selected from HF, HCl, HBr, $HNO_3$, $HNO_2$, $H_2SO_4$ or $HClO_4$.

4. A composite according to claim 1 wherein the organic polymer is selected from the group consisting of epoxy resins, thermoplastic resins, thermosetting resins, aromatic resins, polyolefins, polyesters, polyethers, polyamides, polycarbonates, polyurethanes, condensed aldehyde resins, polyfluorinated olefins, mixtures and copolymers thereof.

5. A composite according to claim 1 which further comprises the intercalated compound in the form of a fiber and additional pure graphite in the flake form combined into the organic matrix.

6. A composite according to claim 1 which further comprises the intercalated compound in the form of a flake and additional pure graphite in fiber form combined into the organic matrix.

7. A process for producing a composite according to claim 1, which comprises
   intercalating graphite at a controlled temperature of about 10° C. to about 200° C.;
   exposing the intercalated graphite to an inert or active gas at a pressure of about an atmosphere;
   reducing slowly the pressure of the atmosphere surrounding the intercalated graphite to a pressure of about $10^{-4}$ inches of mercury; and
   mixing and melding the intercalated graphite and organic polymer in an inert atmosphere and at atmospheric pressure so that a substantially even dispersion is produced and orientation of the intercalated graphite is maintained.

8. A composite according to claim 1 wherein the organic polymer is doped with a dopant metal halide salt wherein the metal halide salt is selected from boron trihalide, a tetrahalide of a Group IV element or a pentahalide of a Group V element.

* * * * *